3,341,551
TETRAANTHRIMIDE VAT DYESTUFFS
Walter Hohmann and Heinrich Vollmann, Leverkusen, Germany, assignors to Farbenfabriken Bayer Aktiengesellschaft, Leverkusen, Germany, a corporation of Germany
No Drawing. Filed July 28, 1965, Ser. No. 475,589
Claims priority, application Germany, Aug. 8, 1964,
F 43,704
5 Claims. (Cl. 260—316)

The present invention is concerned with new vat dyestuffs and with the production thereof.

We have found that new very fast vat dyestuffs are obtained when 1 mol 1-acylamino-4,5,8- or 3,5,8-trichloro-anthraquinone is reacted with approximately 3 mol of unsubstituted or substituted 1-amino-anthraquinones to give the corresponding tetraanthrimides and these, if desired, converted by means of condensing agents into the corresponding tetraanthrimidomono-, -di- or -tricarbazoles.

The trichloro-acylamino-anthraquinones used as starting materials for the production of the new vat dyestuffs according to the present invention can easily be obtained by acylation of the corresponding 1-amino-trichloro-anthraquinones with, for example, acetic anhydride, acetyl chloride, propionyl chloride, benzoyl chloride or anthraquinone-β-carboxylic acid chloride.

Examples of 1-amino-anthraquinones which can be reacted with the 1-acylamino-trichloroanthraquinones to give the new vat dyestuffs according to the present invention include 1-amino-anthraquinone, 1-amino-4- and -5-benzoylamino-anthraquinone and 1-amino-anthraquinone-3,4-benzacridone. Per mol of acylamino-trichloro-anthraquinone, there are reacted approximately three mol of the 1-amino-anthraquinone or of a mixture of 1-amino-anthraquinones. In some cases, the reaction can be carried out with the use of a small excess of the 1-amino-anthraquinones.

The reaction of the trihaloacylamines is expediently carried out in high-boiling organic solvents, such as naphthalene or nitrobenzene, with the addition of acid-binding agents, such as alkali metal carbonates or alkali metal acetates, and in the presence of catalysts, such as copper salts. Preferably the reaction is carried out at temperatures in the region of about 200 to 230° C.

The reaction products obtained may be treated with condensing, especially carbazolising agents, for example, aluminium chloride alone or in conjunction with sodium chloride, tertiary organic bases, ammonia or sulphurous acid. For this reaction the usually for such ring closure applied reaction conditions are used, especially temperatures of about 110 to 150° C. by using a mixture of aluminum chloride and pyridine bases or about 140 to 180° C. by using a mixture of aluminium chloride and sodium chloride.

The new compounds according to the present invention are valuable dyestuffs which can be used, for example, for dyeing and printing vegetable fibres. The dyeings and printings produced with them are very fast.

In the following examples, which are given for the purpose of illustrating the present invention, reference is made to the following general formulae:

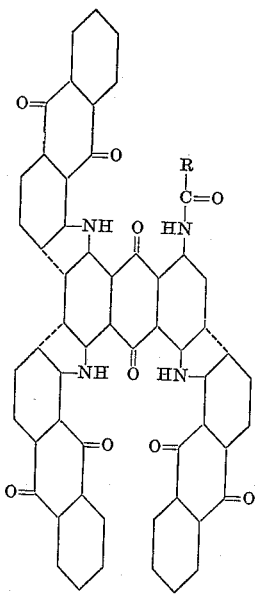

Formula I

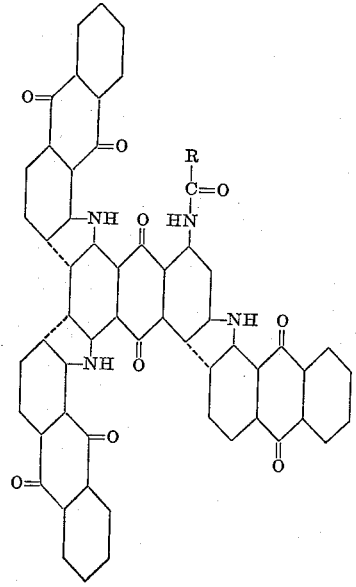

Formula II in which the broken lines optionally stand for a C—C bond and R stands for a preferably lower alkyl radical, an unsubstituted or substituted phenyl radical or a β-anthraquinonyl radical:

*Example 1*

40 parts 1-benzoylamino-4,5,8-trichloroanthraquinone, 71.8 parts 1-amino-anthraquinone, 37 parts sodium carbonate, 1 part copper powder, 1 part cuprous chloride and 800 parts naphthalene are heated together for 10 hours at the boiling temperature of the naphthalene. The mixture is then cooled to about 130° C. and 800 parts chlorobenzene are added. The reaction product, which crystallizes in well developed needles, is filtered off at 100° C. and washed with chlorobenzene. The filter cake is subjected to steam-distillation. After filtration, 73 parts of a black crystalline powder are obtained, which dissolves only with difficulty in concentrated sulphuric acid, giving a dirty-green colour. The compound is a tetraanthrimidocarbazole of general Formula I in which R is a phenyl radical.

If nitrobenzene is used as solvent, instead of naphthalene, the same product is obtained.

At temperatures starting at 50° C. and rising to 110° C., 280 parts ground anhydrous aluminium chloride are slowly introduced into 560 parts pyridine. At about 110° C., 70 parts of the tetraanthrimide described above are introduced into this melt. The reaction mixture is heated at 140° C. for 1 hour, the excess of pyridine being distilled off, the melt then poured into a dilute sodium hydroxide solution, the reaction mixture heated to 80° C., with the addition of a little sodium hypochlorite solution, filtered and the filter cake washed until neutral. The dyestuff thus obtained, the structure of which corresponds to general Formula I, in which the broken lines are C—C bonds and R is a phenyl radical, dyes cotton from a red-brown vat in very fast khaki shades.

*Example 2*

10 parts of the tetraanthrimide obtained in Example 1 are introduced at 130° C. into a melt of 50 parts aluminium chloride and 10 parts sodium chloride. The melt is stirred for 3 hours at 140° C. and subsequently for 1 hour at 170 to 180° C., then poured at 130° C. into an excess of dilute sodium hydroxide solution, heated to boiling, filtered off with suction, reslurried in water, treated at 80° C. with a sodium hypochlorite solution, again filtered off with suction, washed until neutral and dried. 9.5 parts of a dyestuff are obtained which dyes cotton from a red-brown vat in a khaki colour, the shade of which is somewhat more brownish than that of a dyeing with the dyestuff obtained in Example 1. This dyestuff differs from that described in Example 1 by a somewhat lower degree of carbazolisation i.e. it corresponds to general Formula I in which only two of the broken lines are C—C bonds.

*Example 3*

43 parts 4,5,8-trichloro-1-benzoylamino-anthraquinone, 114 parts 5-benzoylamino-1-amino-anthraquinone, 48 parts sodium carbonate, 1 part copper powder, 1 part cuprous chloride and 800 parts naphthalene are heated together for 10 hours at the boiling temperature of the naphthalene. The mixture is then cooled to 120° C., diluted with 800 parts pyridine, the reaction product which crystallises in needles is filtered off at 100° C., washed with pyridine and water and the product freed from copper salts by boiling with dilute hydrochloric acid. 109 parts of a tetraanthrimide of general Formula I are obtained in which each of the three 1-amino-anthraquinonyl radicals contains a benzoylamino group in the 5-position.

When this tetraanthrimide is treated with aluminium chloride in pyridine, as described in the second paragraph of Example 1, a dyestuff is obtained which dyes cotton in a brown shade and is the corresponding tetraanthrimido-tricarbazole.

*Example 4*

When, instead of 114 parts 1-amino-5-benzoylamino-anthraquinone, an equal quantity of 1-amino-4-benzoylamino-anthraquinone is employed in Example 3, then 102 parts of a tetraanthrimide of general Formula I are obtained in which each of the three 1-aminoanthraquinonyl radicals contains a benzoylamino group in the 4-position, and which dissolves in concentrated sulphuric acid with a greenish-khaki colour.

When treated with aluminium chloride in pyridine, this tetraanthrimide yields a vat dyestuff which dyes cotton in intense violet-brown shades and is the corresponding tetraanthrimido-tricarbazole.

*Example 5*

10 parts 1-benzoylamino-4,5,8-trichloroanthraquinone, 8 parts 4-amino-anthraquinone-2, 1(N)-1′,2′(N)-benzacridone, 4 parts sodium carbonate, 0.2 part suprous chloride and 250 parts naphthalene are heated together at a temperature of from 180 to 200° C. in the course of 2 hours, 12 parts 1-amino-anthraquinone, 4 parts sodium carbonate and 0.2 part copper powder are then added and the melt is kept for 10 hours under gentle reflux. After working up as described in the first paragraph of Example 1, 24 parts of a bluish-black powder are obtained. The product is a tetraanthrimide of general Formula I in which one of the three 1-amino-anthraquinonyl radicals contains a 2′,3′-α-quinolone system fused in the 4,3-position:

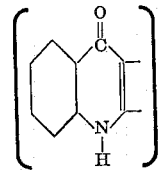

This tetraanthrimide is treated with aluminium chloride/pyridine, as described in Example 1, to give a dyestuff which dyes cotton in olive-green shades.

*Example 6*

When, in Example 5, there are used, instead of 8 parts, 16 parts 4-amino-anthraquinone-2,1(N)-1′,2′(N)-benzacridone and, instead of 12 parts, only 8 parts 1-amino-anthraquinone, then a tetraanthrimide is obtained which, after carbazolisation in a pyridine/aluminium chloride melt, dyes cotton in strongly greenish-grey shades. The dyestuff corresponds to general Formula I in which two of the three 1-amino-anthraquinonyl radicals contain a fused α-quinolone system.

*Example 7*

39 parts 1-benzoylamino-3,5,8-trichloroanthraquinone, 67 parts 1-amino-anthraquinone, 36 parts sodium carbonate, 2 parts of a copper mixture and 800 parts naphthalene are heated together for 12 hours at the boiling temperature of the naphthalene. The mixture is then cooled to 130° C., diluted with 800 parts chlorobenzene, filtered off with suction while hot, washed with hot chlorobenzene and the filter cake freed from chlorobenzene by steam distillation. 66 parts 1-benzoylamino-3,1′-5,1″-8,1‴-tetraanthrimide of general Formula II in which R is a phenyl radical, are obtained, which dissolves only with difficulty in concentrated sulphuric acid giving a green colour.

10 parts of this compound are treated in a pyridine/aluminium chloride melt, prepared as in Example 1, at 140 to 145° C. for 2 hours and subsequently freed from aluminium salts with an excess of dilute hydrochloric acid. The dyestuff thus obtained dyes cotton from a red-brown vat in intense brownish-khaki shades. The dyestuff is the corresponding tetraanthrimide-tricarbazole (general Formula II in which R is a phenyl radical and each broken line means a C—C bond).

*Example 8*

87.5 parts 1-acetylamino-4,5,8-trichloroanthraquinone, 180 parts 1-amino-anthraquinone, 90 parts sodium carbonate, 2000 parts naphthalene, 5 parts copper powder and 5 parts cuprous chloride are heated for 5 hours at the boiling temperature of the naphthalene. Starting at 140° C., the melt is diluted with 2000 parts pyridine, the precipitated tetraanthrimide is filtered off with suction at 100° C., washed with hot pyridine, boiled with dilute hydrochloric acid, washed until neutral and dried. 167 parts 1-acetylamino-4,1'-5,1''-8,1'''-tetraanthrimide are obtained.

When this product is carbazolised as described in Example 1, a dyestuff is obtained which dyes cotton from a red-brown vat in a similar shade to the dyestuff obtained in Example 1 and is the corresponding tetraanthrimide-tricarbazole (general Formula I in which R is a methyl radical and each broken line means a C—C bond).

We claim:
1. A compound selected from the group consisting of compounds of the formulae

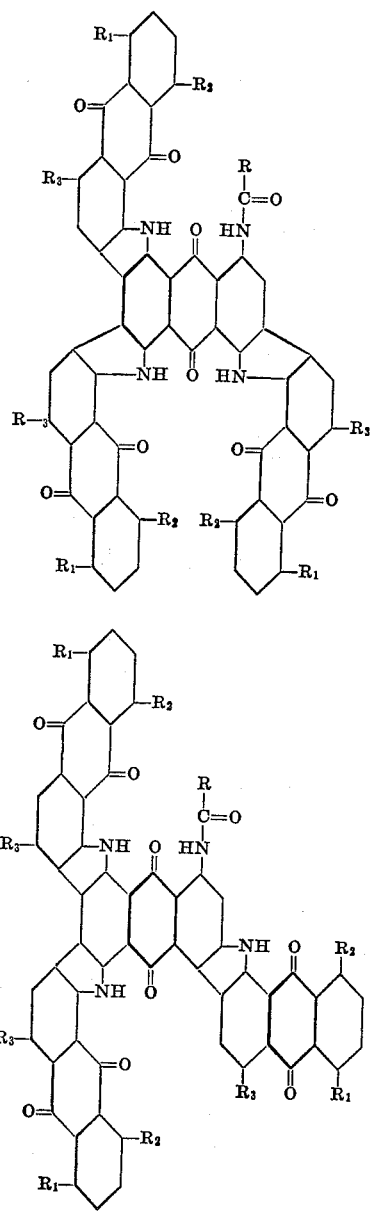

wherein R is a methyl radical, an ethyl radical, a phenyl radical or a β-anthroquinonyl radical and wherein $R_1$, $R_2$ and $R_3$ represents hydrogen or wherein one group of the radicals $R_1$, $R_2$ or $R_3$ represents a bonzoylamino group.

2. Compound of the formula

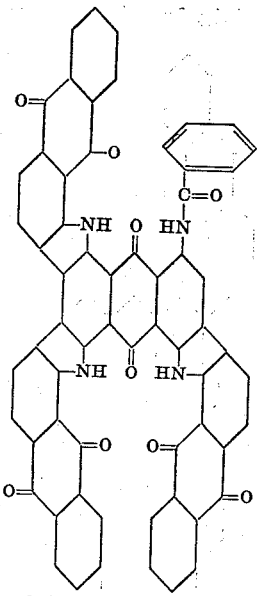

3. Compound of the formula

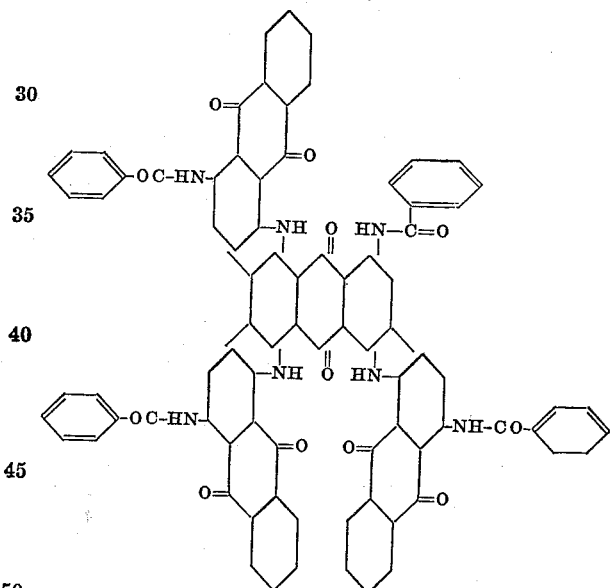

4. Compound of the formula

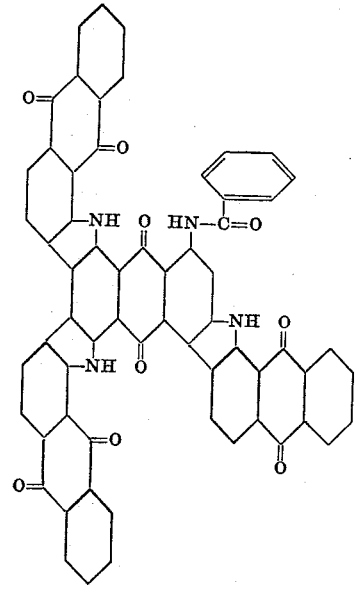

5. Compound of the formula
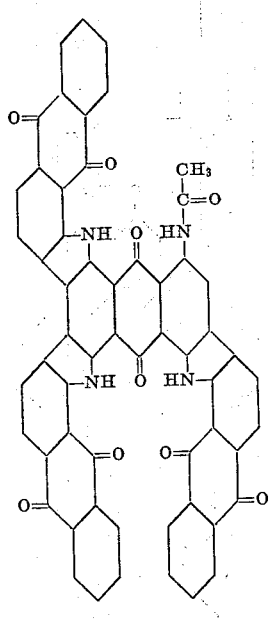
References Cited
UNITED STATES PATENTS
2,212,028 8/1940 Lulek _____ 260—316
2,212,965 8/1940 Wieners et al. _____ 260—316
2,884,425 4/1959 Grelat _____ 260—316
WALTER A. MODANCE, *Primary Examiner.*
JOHN D. RANDOLPH, *Examiner.*
J. M. FORD. *Assistant Examiner.*